UNITED STATES PATENT OFFICE.

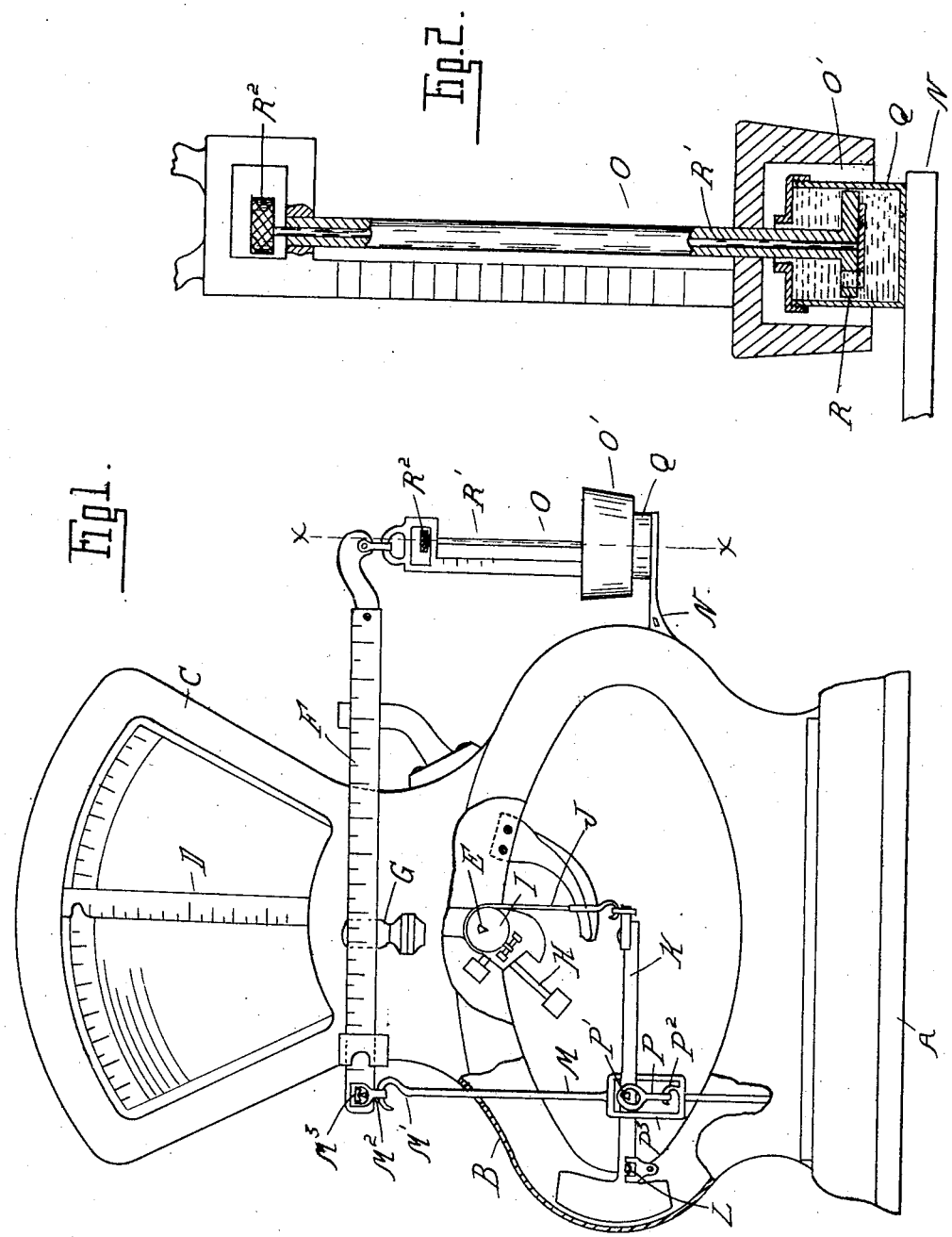

WALTER F. STIMPSON, OF DETROIT, MICHIGAN, ASSIGNOR TO GEORGE W. HURD, OF DUNDEE, MICHIGAN.

COMPUTING-SCALE.

1,114,307.    Specification of Letters Patent.    Patented Oct. 20, 1914.

Application filed November 5, 1910. Serial No. 590,867.

*To all whom it may concern:*

Be it known that I, WALTER F. STIMPSON, a citizen of the United States of America, residing at Detroit, in the county of Wayne and State of Michigan, have invented certain new and useful Improvements in Computing-Scales, of which the following is a specification, reference being had therein to the accompanying drawings.

The invention relates to computing scales of the automatic and semi-automatic type, more particularly designed for use as platform or counter scales.

It is the object of the invention, first, to obtain a simpler construction of operating mechanism, second, one in which symmetry in outline may be maintained and at the same time an advantageous arrangement of the mechanical elements obtained.

With these objects in view, the invention consists in the construction as hereinafter set forth.

In the drawings,—Figure 1 is a sectional perspective view of the scale; and Fig. 2 is a section taken on line $x$—$x$ of Fig. 1.

My invention is applicable to computing scales of that type in which movement of the index hand over the computing chart is variably controlled by the deflection of a pendulum weight. Movement is imparted to the index through suitable connections with the platform levers, thus rendering the weighing operation automatic. In addition to the automatic weighing mechanism there is usually provided a tare beam with a shiftable poise and a counterpoise having detachable weights. This tare beam is also connected with the platform levers to be operated simultaneously with the movement of the index.

To obtain simplicity in construction, I have devised an operating mechanism in which a single steelyard rod forms a common actuating connection for the tare beam and the automatic weighing mechanism. I have also designed the parts with reference to each other so as to produce a symmetrical arrangement and a sensitive weighing mechanism.

In detail A is the platform frame containing any suitable construction of platform levers (not shown), B is a frame rising from the platform frame and surmounted by the fan shaped indicating section C herein shown as a computing chart. This frame and chart are preferably of symmetrical form and are centrally arranged with respect to the platform.

D is the index hand for the chart which is fulcrumed at E in the center line of the frame, and F is the tare beam also fulcrumed in the center line of the frame on bearings G and arranged above the fulcrum E.

H is the pendulum weight attached to the index D, I is a pulley or segment and J a flexible band engaging said pulley or segment and forming an operating connection for the pendulum.

K is a lever to which the band J is attached, said lever being fulcrumed at L upon the frame B, and M is a steelyard rod forming a common actuating connection for the lever K and tare beam F extending downward to the platform levers.

It is desirable to avoid making the pendulum and its operating mechanism too small in size, and on the other hand, to avoid unnecessarily increasing the dimensions of the scale frame. I have secured advantageous arrangement of the parts by extending the frame B laterally to the full width or even a greater width than the platform at that point in the vertical height where the lever K is fulcrumed. This permits of using a longer lever and also of increasing the multiplication thereof so that the diameter of the pulley E may be correspondingly enlarged and the required multiplication between the platform levers and index maintained. This arrangement also permits of using one steelyard rod M for operating both the lever K and the tare beam F. It is only necessary that this increased width should be at one point, and to produce a pleasing and symmetrical design of frame, the portion B is in the form of an annulus of oval or elliptical contour. Thus, the fulcrum L for the lever K may be arranged at the outer end of the oval frame while the balance weight K' for said lever may be concealed within the frame, the section of which is preferably of U shape. The opposite end of the oval which for symmetry extends equally from the center line, is preferably employed for supporting a guide arm N for the counterpoise O of the tare beam F. Thus, I obtain a frame that has both mechanical utility and symmetry in appearance, while by making the vertical axis of the ellipse small relative to the lateral axis, the frame is quickly reduced in width to suitable dimensions for supporting the chart.

The steelyard rod M is connected at its upper end by the hook M' to a pivotal link M² which engages the knife edge pivots M³ of the beam F. There is also provided a second pivotal link P for connecting the rod with the knife edge pivot P' on the beam K. This link permitting slight differential lateral movement of the pivots P' and M³. As shown it is connected to the hook P² arranged centrally of the bifurcation P³ in the rod M.

The scales of the character above described are usually provided with dash-pots for checking the oscillation of the index. I have conveniently disposed of this dash-pot by arranging it within the counterpoise of the tare beam, and in operation it performs in addition to its function of a retarding device, that of the check for limiting the oscillation of the counterpoise.

In detail Q is the cylinder of the dash pot which is mounted upon the bracket arm N and engages a recess in the base O' of the counterpoise O.

R is the piston engaging the dash-pot which has a shank R' connecting it to the counterpoise preferably near the upper end thereof. This shank is also used for adjusting the restriction of the fluid passage for the dash-pot which is accomplished by a rotatable rod, the milled head R² being provided for this purpose. The arrangement is such that the counterpoise can oscillate vertically, being merely retarded in its action by the dash-pot, and also held from swinging laterally, but without interfering with the balance. Furthermore, the counterweight may be used with detachable weights which are supported thereon without interference with the dash-pot.

What I claim as my invention is:

1. The combination of a platform, a frame extending thereabove, an indicating section on said frame, an index for said section, a pendulum weight for said index, a tare beam, said pendulum weight and tare beam being both fulcrumed centrally of said frame the one above the other, an intermediate lever operatively connected with said pendulum weight, and a common steelyard rod connected to said intermediate lever and tare beam and operatively connected with the platform mechanism.

2. The combination of a platform, a frame extending thereabove having an indicating section at its upper end and a laterally enlarged portion below said section, a tare beam and an index having a pendulum weight both fulcrumed centrally of said frame and between said section and the laterally enlarged portion, an intermediate lever for operating said index and pendulum weight fulcrumed upon said laterally enlarged portion, and a steelyard rod connecting the platform mechanism with said intermediate lever and tare beam.

3. The combination of a platform, a frame extending upward from said platform having an indicating section at its upper end and a laterally enlarged portion below said section, a tare beam fulcrumed centrally of said frame intermediate said chart and laterally enlarged portion, an index fulcrumed below said tare beam and having a pendulum weight operatively associated therewith, an intermediate lever connected with said index and pendulum weight and fulcrumed at one side of said laterally enlarged portion of the frame, a steelyard rod for operating said intermediate lever and said tare beam operably connected to said platform, a counterpoise for said tare beam, and a guide for said counterpoise on the opposite side of said laterally enlarged portion.

4. The combination of a platform, a frame extending upward therefrom having an indicating section at its upper end, a laterally enlarged oval annular portion below said chart, a tare beam and an index for said section fulcrumed centrally of said frame intermediate the oval annular portion and the chart, a lever fulcrumed at one side of said enlarged annular portion and operatively connected at its opposite end to said index, a steelyard rod operatively connected to the platform, said lever and said tare beam, a counterpoise for said tare beam, and a guide for said counterpoise connected to the opposite side of said annular portion.

5. In a scale, the combination with a beam, of a counterpoise therefor, and a dash-pot located within said counterpoise.

6. In a scale, the combination with a beam, of a counterpoise therefor having a recess, a dash-pot located within the recess of said counterpoise, and means for adjusting said dash-pot extending upward in said counterpoise.

7. In a scale, the combination with a beam, of a counterpoise therefor having a recess, a dash-pot located within the recess in said counterpoise and having one element attached thereto, and a stationary support for the other element of said dash-pot forming a guide for said counterpoise.

8. In a scale, the combination of a platform, a frame extending thereabove having an indicating section at its upper end and a lateral enlarged portion below said section, a tare beam, and an index having a pendulum weight, both fulcrumed on said frame beneath said section, an intermediate lever for operating said index and pendulum weight, said lever being fulcrumed upon said lateral enlarged portion to one side of the tare beam fulcrum, and a steelyard rod connected to the tare beam and intermediate lever between the fulcrums thereof and to the platform mechanism.

9. In a scale, the combination of a platform, a frame extending thereabove having an indicating section at its upper end and symmetrical lateral enlargements below said section, a tare beam and an index having a pendulum weight, both fulcrumed on said frame beneath said section, an intermediate lever for operating said index and pendulum weight, said lever being fulcrumed upon one of said lateral enlargements and to one side of the tare beam fulcrum, a steelyard rod secured to the tare beam and intermediate lever between the fulcrums thereof and connected to the platform mechanism, a counterpoise for said tare beam, and a guide for said counterpoise carried by the other of said lateral enlargements.

In testimony whereof I affix my signature in presence of two witnesses.

WALTER F. STIMPSON.

Witnesses:
JAMES P. BARRY,
AUBREY PULLEYBLANK.

Copies of this patent may be obtained for five cents each, by addressing the "Commissioner of Patents, Washington, D. C."